United States Patent [19]
Burrier

[11] Patent Number: 5,646,625
[45] Date of Patent: Jul. 8, 1997

[54] RADAR SYSTEM

[75] Inventor: Richard W. Burrier, Groton, Mass.

[73] Assignee: Raytheon Company, Lexington, Mass.

[21] Appl. No.: 572,782

[22] Filed: Dec. 15, 1995

[51] Int. Cl.$^6$ .................................................. G01S 13/02
[52] U.S. Cl. ........................................ 342/175; 342/198
[58] Field of Search .................................. 342/175, 195, 342/165, 203, 54, 194, 198

[56] References Cited

U.S. PATENT DOCUMENTS 3,021,521  2/1962  Hutchins ................................. 342/175

*Primary Examiner*—Daniel T. Pihulic
*Attorney, Agent, or Firm*—Donald F. Mofford

[57] ABSTRACT

A radar system having a radar transmitter and a radar receiver. The radar receiver includes a "local" receiving station and a "remote" located antenna station. A feedthrough nulling system is provided. The nulling system includes a "remote" combiner for providing an feedthrough null residual signal representative of the difference in power between a signal received by the antenna station and a feedthrough nulling signal. A "remote" downlink modulator, disposed at the antenna station, produces an optical signal representative of the feedthrough null residual signal. A "local" downlink optical detector, disposed at either the receiver station or the transmitter, detects the optical signal representative of the feedthrough null residual signal. A variable attenuator-phase shifter is fed by a signal from the transmitter and the detected optical signal representative of the feedthrough null residual signal and changes the gain and phase shift of the signal from the transmitter in accordance with the signal detected optical signal to produce a replica of the transmitted signal with proper gain and phase shift to null feedthrough signals received at the antenna station. An "local" uplink laser modulator, disposed at the receiver station or the transmitter, produces an optical signal representative of the replica of the transmitted signal with proper gain and phase shift to null feedthrough signals received at the receiving antenna station such fed signal. An "remote" uplink detector, disposed at the antenna station, detects the optical signal produced by the uplink laser modulator, and produces the feedthrough nulling signal. A "local" noise degeneration system is also provided.

4 Claims, 3 Drawing Sheets

RADAR SYSTEM

This invention was made with Government support under Contract No. DAAH01-93-C-A010 awarded by the Department of the Army. The Government has certain rights in this invention.

BACKGROUND OF THE INVENTION

This invention relates generally to radar systems and more particularly to feedthrough nulling arrangements used in radar systems.

As is known in the art, in many applications it is required that a radar transmitter operate at relatively high output power levels yet be of a relatively small size. Further, in order to improve transmitter reliability it is advantageous to use solid-state components. One common solution to these requirements is transmit with a continuous wave (CW) waveform, as distinguished form a pulsed waveform. The use of a CW wave form minimizes transmitter size when implemented with solid-state components because the transmitter design margins are limited by average power rather than peak power requirements of pulsed waveform systems. However, CW radar systems are subject to high levels of transmitter power feeding directly into the receiver. Such effect is commonly referred to as "feedthrough". Such feedthrough can saturate the receiver and prevent proper detection of the desired reflected radar energy. That is, the receiver may be required to provide sensitivities that are near the benign thermal, kTNF, noise floor of the system while maintaining simultaneous operation in a non-distorting manner even in the presence of relatively high feedthrough. Therefore, with the CW system, the requirements for full sensitivity and high linearity become difficult to achieve as the feedthrough levels increase.

One technique suggested to reduce feedthrough is to place the transmitter and receiver at different locations. Such suggestion is not satisfactory where site locations for both transmitter and receiver are limited. Also, the antenna directional patterns required to cover an intended area may require the receive antenna to stare directly at the transmit antenna and thereby exacerbate the receiver desensitization through the presence of high feedthrough levels.

More recently, it has been suggested that the receiving antenna station be remotely located from the radar receiver station with the antenna station being coupled to the receiver station through an optical link.

SUMMARY OF THE INVENTION

In accordance with the present invention, a radar system is provided having a radar transmitter and a radar receiver. The radar receiver includes an antenna station and a receiving station. The transmitter and the receiver station may be near each other, or may be remotely located from each other. However, the antenna station is located remotely from either the receiver station and/or the transmitter. Thus, here the transmitter and/or receiver station are sometimes hereinafter referred to as being "local" and the antenna station as being "remote". A feedthrough nulling system is provided. The nulling system includes a "remote" combiner at the "remote" antenna station, for providing a feedthrough null residual signal representative of the difference in power between a signal received by the antenna station and a feedthrough nulling signal. A downlink modulator, disposed at the antenna station, produces an optical signal representative of the feedthrough null residual signal. A downlink optical detector, disposed at either the transmitter or receiver station, detects the optical signal representative of the feedthrough null residual signal. A variable attenuator-phase shifter, disposed at either the transmitter or receiver, is fed by a portion of the signal transmitted by the transmitter. The variable attenuator-phase shifter is controlled by a signal derived from the detected optical signal representative of the feedthrough null residual signal. The variable attenuator-phase shifter changes the gain and phase shift of the portion of the signal transmitted thereto from the transmitter to generate the feedthrough nulling signal. More particularly, the output of the variable attenuator-phase shifter is a replica of the transmitted signal with proper gain and phase so that, after "local" uplink optical transmission at either the transmitter or receiver station to the antenna station, the proper feedthrough nulling signal is produced for the "remote" combiner at the antenna station.

More particularly, the "local" uplink laser modulator, disposed remotely from the antenna station, produces an optical signal representative of the replica of the transmitted signal with proper gain and phase shift to null feedthrough signals received at the antenna station fed such signal. An uplink detector, disposed at the antenna station, detects the optical signal produced by the uplink laser modulator, and produces the feedthrough nulling signal.

In accordance with another feature of the invention, a "local" noise degeneration system is provided. The noise degeneration system includes a "local" detector (i.e., a detector disposed at either the transmitter or receiver station), for detecting a portion of the "local" uplink laser modulator optical signal transmitted to, and detected by, the "remote" antenna station based uplink detector. A "local" noise cancellation combiner is fed by the "local" detector (i.e., the detector disposed at either the transmitter or receiver station) and a portion of the signal transmitted by the transmitter. The variable gain-phase shifter combines an output of the noise cancellation combiner and the detected optical signal representative of the feedthrough null residual signal, to change the gain and phase shift of the signal from the transmitter in accordance with the signal detected optical signal and the output of the noise cancellation combiner in producing the replica of the transmitted signal with its proper gain and phase shift.

With such arrangement, the optical uplink signal produced by the "local" uplink laser modulator is detected by two independent detectors; the "remote" detector at the antenna station, and the "local" detector at either the transmitter or the receiver station. Because the "local" uplink laser noise is detected by the closely positioned "local" detector, and tracked, by the "local" detector (and therefore is not exposed to noise imparted to the optical uplink signal in its transmission to the remotely located, antenna station detector) in a relatively high bandwidth noise degeneration loop, and the "local" and "remote" detectors are matched. The "local", high bandwidth noise degeneration loop, acts to degenerate the uplink laser noise and to linearly modulate the "local" uplink laser with the feedthrough null signal. Thus, if the "local" and "remote" detectors are matched, and the noise is degenerated at the "local" detector, then it is also degenerated at the "remote" detector.

DESCRIPTION OF THE PREFERRED EMBODIMENTS

Figure 1:
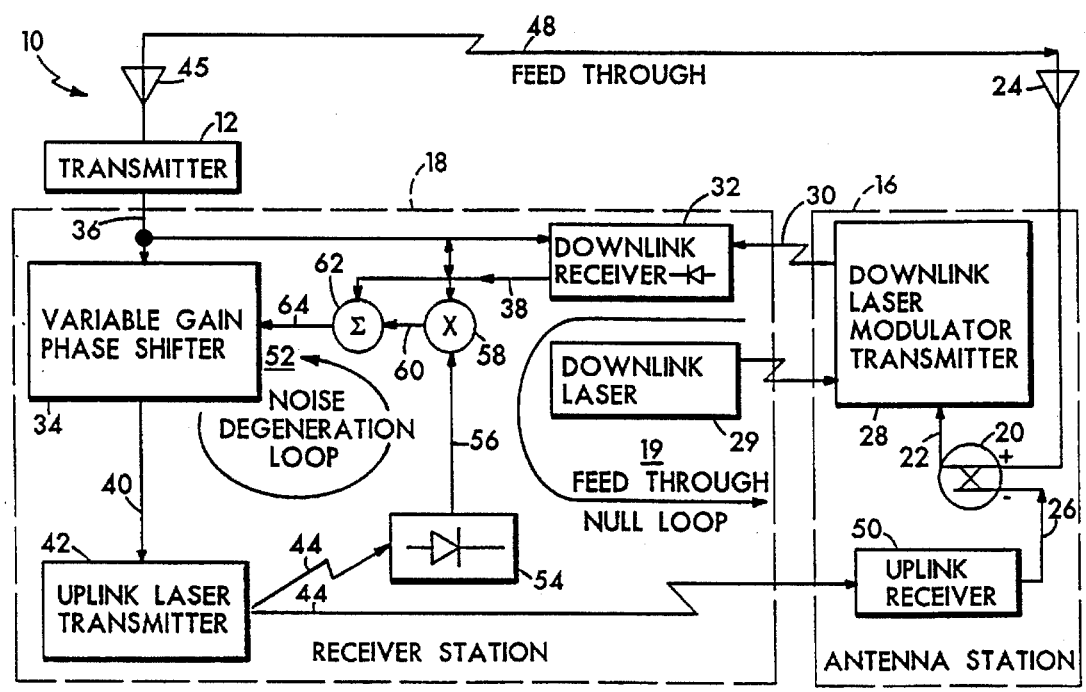
FIG. 1 is a block diagram of a radar system according to the invention.

Referring now to FIG. 1, a radar system 10 is shown having a radar transmitter 12 and a radar receiver 14. The radar receiver 14 includes an antenna station 16 and a receiving station 18. The transmitter 12 and the receiver station 18 may be near each other or may be remotely located from each other. In either case, the antenna station 16 is located remotely from either the receiver station 18 and/or the transmitter 12. Thus, here the transmitter 12 and/or receiver station 18 are, as noted above, sometimes hereinafter referred to as being "local" and the antenna station as being "remote". A feedthrough nulling system 19 is included. The feedthrough nulling system 19 includes a "remote" combiner 20, here a 180 degree directional coupler, for providing an feedthrough null residual signal on line 22 representative of the difference in power between a signal received by the antenna 24 at the antenna station 16 and a feedthrough nulling signal on line 26. A downlink laser modulator transmitter 28, disposed at the antenna station 16, and fed by a downlink laser 29 at the receiver station 18 and the null residue signal on line 22 produces an optical signal 30 representative of the feedthrough null residual signal on line 22. A downlink optical receiver 32, disposed at the receiver station 18, detects the optical signal 30 representative of the feedthrough null residual signal on line 22. A variable attenuator-phase shifter 34 is fed by a portion of the signal transmitted by the transmitter 12, i.e., such portion of the transmitted signal being produced on line 36, and the detected optical signal representative of the feedthrough null residual signal on output 38. The variable attenuator-phase shifter 34 changes the gain and phase shift of the portion of the signal on line 36 transmitted by the transmitter 12 in accordance with the detected feedthrough null signal at output 38 to produce a replica of the transmitted signal on line 40 with proper gain and phase so that, after uplink optical transmission by "local" uplink laser transmitter 42 to the antenna station 16, a proper feedthrough nulling signal is produced on line 22 for the "remote" combiner 20 at the antenna station 16.

More particularly, the "local" uplink laser transmitter 42, disposed at the receiver station 18, produces an optical signal 44 representative of the replica of the transmitted signal with proper gain and phase shift to null feedthrough signals 48 received at the antenna station 16. An uplink receiver 50, disposed at the antenna station 16, detects the optical signal 44 produced by the "local" uplink laser transmitter 42, and produces the feedthrough nulling signal on line 22.

A noise degeneration system 52 is provided. The noise degeneration system 52 includes a "local" detector 54, disposed close, or adjacent to, the "local" uplink laser transmitter 42, here at the receiver station 18, for detecting a portion of the optical signal 44 produced by the "local" uplink laser transmitter 42 and for producing a noise cancellation signal on line 56. A "local" noise cancellation combiner, here a mixer section 58, is fed by the noise cancellation signal on line 56 and a portion of the transmitted signal on line 36. The video signal produced at the output of the mixer section 58 at output 60 is combined with the video signal produced by the uplink receiver 32 in a summing network 58 to produce a gain-phase shift control signal on output 64 for the variable gain-phase shifter 34. The combining network 62 combines the output 60 of the noise cancellation combiner network 62 and the detected optical signal representative of the feedthrough null residual signal produced on output 38 of the downlink receiver 32 to change the gain and phase shift of the signal on line 36 from the transmitter 12 in accordance with the detected residual null signal on output 38 and the output 60 of the noise cancellation combiner 62. In this way, the replica of the transmitted signal on line 36 is adjusted in gain and phase so that, after passing via line 40 through uplink transmitter 42 to uplink receiver 50, the feedthrough signal 48 received at the receiving antenna 24 is nulled by the nulling signal on line 26 in coupled 20.

Figure 2:
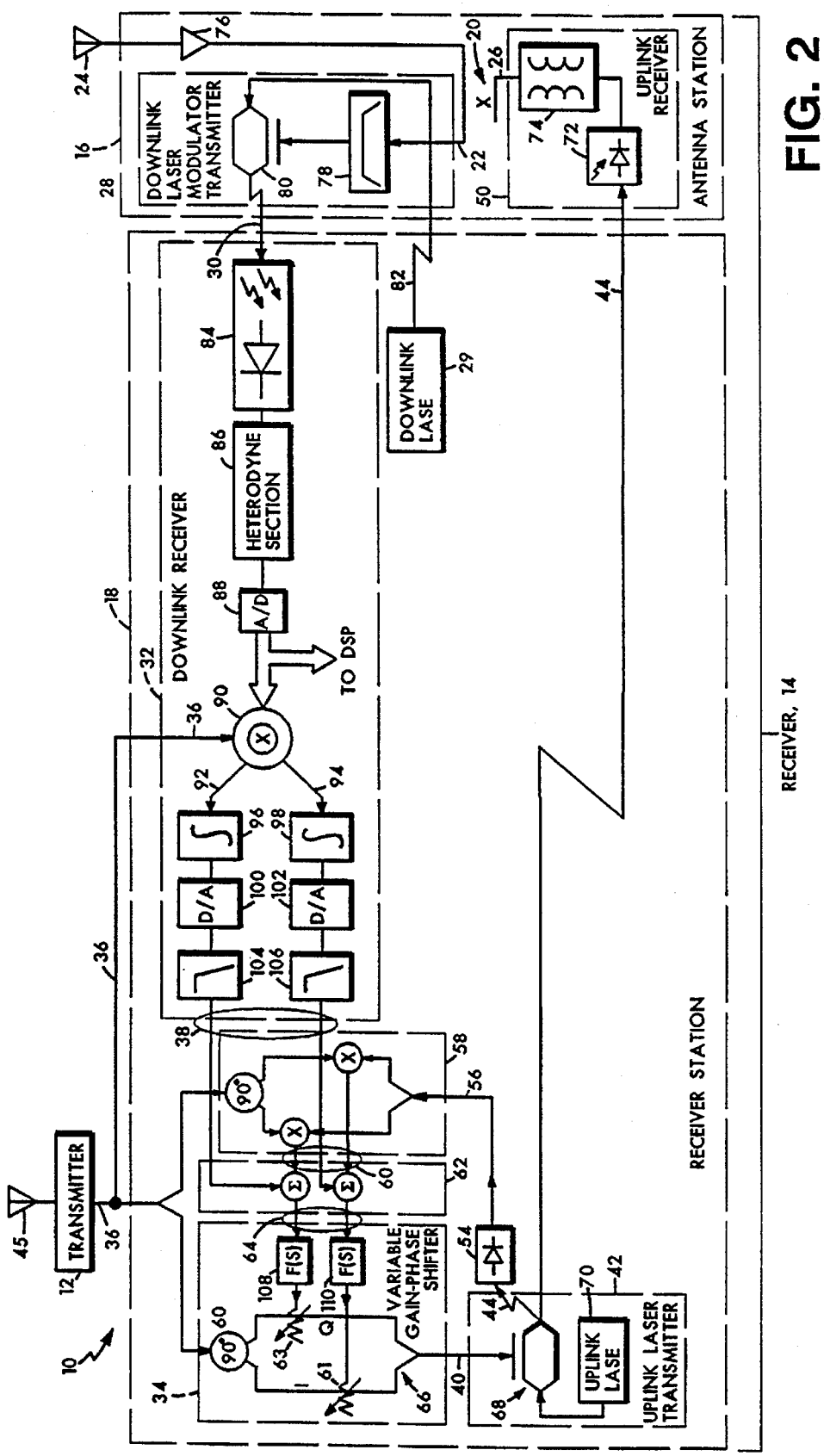
FIG. 2 is a more detailed block diagram of the radar system of FIG. 1.

Referring now to FIG. 2, the radar system 10 is shown in more detail. Thus, the variable gain-phase shifter 34 includes a quadrature power divider 60 fed by a portion of the signal transmitted by the transmitter section 12, as shown. The output of the power divider 60 is thus a pair of quadrature signals (i.e., in-phase (I) and quadrature (Q) signals). The in-phase and quadrature signals are fed through a pair of variable attenuators 61, 63 to a power combiner 66, as shown. The output of the power combiner 66 is fed to an optical modulator 68 of the uplink laser transmitter 42, as shown. Also fed to the modulator 68 is the output of a "local" uplink laser 70. Thus, the modulator 68 and "local" uplink laser 70 provide the "local" uplink laser transmitter 42. The output 44 of the modulator 68 is fed to the "local" diode detector 54, disposed at the receiver section 18 adjacent to the "local" uplink laser 70 and is also transmitted to a "remote" uplink diode detector 72 located at the antenna station 16, as shown. The output of the "remote" uplink diode detector 72 is fed to the 180 degree directional coupler 20 through a transformer 74, as shown. Thus, the "remote" uplink diode detector 72 and transformer 74 provide the "remote" uplink receiver 50 and the feedthrough nulling signal on line 26, as shown.

The output of the receiver antenna 24, which includes feedthrough 32 from the transmitter antenna 45, is fed, via an optional amplifier 76, to a second input of the 180 degree directional coupler 20, as shown. Thus, the directional coupler 20 subtracts the energy received from the receiving antenna 24 and the feedthrough nulling signal on line 26 produced by the uplink receiver 50 to produce the feedthrough null residual signal on line 22. The feedthrough null residual signal on line 22 is fed, via a bandpass filter 78, to a modulator 80, as shown. Also fed to the modulator 80 is the output 82 of the downlink laser 29 located at the receiver station 18. Thus, the bandpass filter 78, the modulator 80 and the signal 82 from downlink laser 29 provide the downlink laser modulator transmitter 28.

The output 30 of the "remote" downlink laser modulator transmitter 28 is fed to a diode detector 84. The diode detector 84 is included in the downlink receiver 32, as shown. The downlink receiver 32 includes a heterodyning section 86 and an analog to digital (A/D) converter 88 fed by the output of diode detector 84, as shown. The output of the A/D converter 88 is fed to a digital signal processor (DSP), for example, for conventional processing of received signals. The output of the A/D converter 88 is also fed to a quadrature mixer 90. Also fed to the quadrature mixer 90 is a portion of the transmitted signal on line 36, as shown. The pair of quadrature output signals produced by the mixer 90 on lines 38 are integrated, or digitally filtered, as indicated in elements 96, 98 and, after reconversion to analog signals by digital to analog (D/A) converters 100, 102, and low pass filters 104, 106 to provide output 38 are fed, via summing network 62 and filters 108, 110 to provide control signals for variable attenuators 63, 61 in the variable gain-phase shifter 34, as shown.

In operation, a feedthrough nulling system 19 (FIG. 1), or loop, is provided. Any residual feedthrough signal produced at the output 22 of the directional coupler 20 serves to adjust the gain and phase shift provided by variable gain and phase shifter 34 to the portion of the transmitted signal on line 36 with the result that a proper feedthrough null signal is produced by the uplink laser transmitter 42. That is, the in-phase and quadrature signal in the I and Q channels of the variable gain-phase shifter 34 are controlled by the control signals produced on output 64 in response to the optically transmitted feedthrough null residual signal 30 to drive such residual signal on line 22 towards zero.

It is again noted that the output of the diode detector 54 is fed to a quadrature mixer section 58, as shown. Also fed to the quadrature mixer section 58 is a portion of the transmitted signal on line 32, as shown. The outputs (i.e., the signals on lines 92, 94) of the quadrature mixer section 58 are, after passing through integrators 96, 98, respectively, D/As 100, 102, respectively, and low pass filters 104, 106, respectively, as shown, added to the signals produced by the downlink receiver 32 in summing network 62, as shown. Such arrangement provides a "local" noise degeneration loop 52 (FIG. 1), as shown, while, simultaneously closing a feedthrough nulling loop 19 (FIG. 1).

More particularly, the "local" noise degeneration loop 52 also provides linear modulation capability. With the feedthrough nulling loop 19, a control signal on output 38 (FIG. 1) produces a vector signal which linearly adjusts the transmit signal sample on line 36 to provide feedthrough null cancellation signal on line 26 to the directional coupler 20, as described. The feedthrough nulling loop 19 close out frequency (i.e., frequency at which the open loop gain equals 0 db), is normally set at a low frequency, <30 Hz, for example. The necessity to deliver the feedthrough null replica signal (the signal on line 26) to the coupler 20 via the optical uplink laser transmitter 42 adds the complication that the uplink laser 70 (FIG. 2), itself, is a source of noise. A representative Nd:YAG uplink laser has a noise level of −127 dBc/Hz at 100 Hz. The noise requirement on the optical uplink transmitter 42 is significantly more severe than the noise on the downlink laser 29 because the uplinked signal to noise is driven by the direct feedthrough level, and not by the residue signal after the feedthrough nulling summation at the directional coupler 20. The result of higher signal to noise (S/N) on the uplink laser 70 is that the uplink laser 70 noise must be nearly 30 dB better than the noise on the downlink laser 29.

To achieve this improved noise performance, the "local" noise degeneration loop 52 (FIG. 1) is closed around the "local" uplink laser 70, i.e., here at receiver station 18. The noise degeneration loop 52 also provides a means to linearly modulate the uplink signal 44 with the feedthrough null control signal on output 38. A portion of the optical uplink signal 44 is recovered locally (i.e., here at the receiver station 18) by detector 54 and compared with the signal from the transmitter, i.e., the signal on line 36, in quadrature synchronization demodulator, or mixer 58. The output 60 is the difference between the transmit sample on line 36 and the signal locally recovered by "local" detector 54 from the "local" uplink laser 42. The quadrature demodulated signal on output 60 is summed in summing network 62 with the feedthrough nulling control signal on output 38 and the resulting residue, on output 64, is applied to loop integrators, F(s), 108, 110 (FIG. 2), where s is the Laplace operator. The "local" noise degeneration loop 52 feedback causes a loop response which is equal to but opposite in polarity to the feedthrough null control loop 19. The noise degeneration loop 52 is closed through the variable gain-phase shifter 34, as shown in FIG. 2. Here, the close-out frequency of the noise degeneration loop 52 is 2 MHz to assure significant noise degeneration over a representative 100 KHz information bandwidth of the rf transmitted waveform. Because the feedthrough null loop 19 has a 30 Hz loop bandwidth, the 2 MHz bandwidth of the noise degeneration loop 52 is essentially transparent to the 30 Hz bandwidth of the feedthrough nulling loop 19.

As noted, the optical uplink signal 44 is detected by two independent photo-detectors, 54, 72 (FIG. 2); the "remote" detector 72, and the "local" detector 54, here at the receiver station 36. With such arrangement, the S/N of the modulated uplink laser 70 noise matches errors generally not greater than −30 dB. Thus, because the "local" uplink laser 70 noise is detected, and tracked, by the "local", higher bandwidth noise degeneration loop 52, and the "local" and "remote" detectors 54, 72, respectively, are matched by the action of the feedthrough nulling loop 19, the noise generated by the uplink laser 70 is degenerated at the "remote" detector 72. The receiver station 18; i.e., "local", high bandwidth noise degeneration loop 52, acts to degenerate the "local" uplink laser 42 noise and to linearly modulate the "local" uplink laser 42 with the feedthrough null signal. Thus, if the "local" and "remote" detectors 54, 72 are matched, and the noise is degenerated at the "local" detector 54, then it is also degenerated at the "remote" detector 72.

Figure 3:
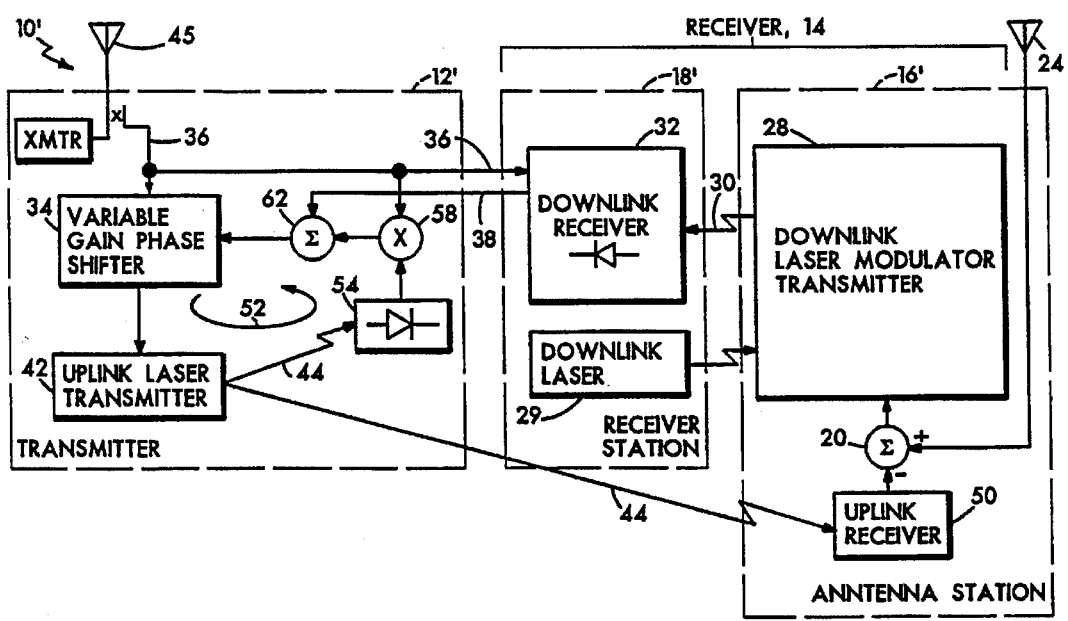
FIG. 3 is a block diagram of a radar system according to an alternative embodiment of the invention.

Referring now to FIG. 3, a radar system 10 is shown. Here, the variable gain-phase shifter 34, uplink transmitter 42, detector 54, mixer section 58 and combining network, described in FIGS. 1 and 2 are located at transmitter station 12', as shown, while the downlink laser 29 and downlink receiver 32 are located at the receiver station 18', as shown. It is first noted the here, as if FIG. 1, the "remote" antenna station is located "remote" from the receiver station 18'; however, here the noise degeneration loop 52 is disposed at the "local" transmitter 12', as shown.

Other embodiments are within the spirit and scope of the appended claims.

What is claimed is:

1. A radar system, comprising:
  a radar transmitter for producing a transmitted signal;
  a radar receiver, comprising:
    a receiver station and a remotely located antenna station; and
  a feedthrough nulling system, comprising:
    a "remote" combiner, disposed at the antenna station, for providing a feedthrough null residual signal representative of the difference in power between a signal received by the antenna station and a feedthrough nulling signal;
    a "remote" downlink modulator, disposed at the antenna station, for producing an optical signal representative of the feedthrough null residual signal;
    a downlink optical detector, disposed remotely from the antenna station, for detecting the optical signal representative of the feedthrough null residual signal;
    an variable attenuator-phase shifter, fed by a portion of the transmitted signal and the detected optical signal representative of the feedthrough null residual signal, for changing the gain and phase shift of the signal from the transmitter in accordance with the detected optical signal to produce a replica of the transmitted signal with proper gain and phase shift to null feedthrough signals received at the antenna station;
    a "local" uplink laser modulator, for producing an optical signal representative of the replica of the transmitted signal with proper gain and phase shift to null feedthrough signals received at the antenna station such fed signal;

an uplink detector, disposed at the antenna station, for detecting the optical signal produced by the uplink laser modulator, for producing the feedthrough nulling signal.

2. The system recited in claim 1 including a noise degeneration system, comprising:

a "local" detector, disposed remotely from the antenna station, for detecting the optical signal produced by the uplink laser modulator, for producing the noise cancellation signal;

a "local" noise cancellation combiner fed by the noise cancellation signal and a signal from the transmitter;

and wherein the variable gain-phase shifter combines an output of the noise cancellation combiner and the detected optical signal representative of the feedthrough null residual signal, for changing the gain and phase shift of the signal from the transmitter in accordance with the signal detected optical signal and the output of the noise cancellation combiner, to produce the replica of the transmitted signal with proper gain and phase shift to null feedthrough signals received at the receiving antenna station.

3. A radar system, comprising:

a radar transmitter;

a radar receiver, having:

a receiver station and a remotely located antenna station;

a feedthrough nulling system, comprising:

a "remote" combiner, disposed at the antenna station, for providing an feedthrough null residual signal representative of the difference in power between a signal received by the antenna station and a feedthrough hulling signal;

a downlink laser disposed remotely from the antenna station;

a downlink modulator, disposed at the antenna station and fed by the downlink laser and the feedthrough null residual signal, for modulating the light produced by the downlink laser with the feedthrough null residual signal to produce an optical signal representative of the feedthrough null residual signal;

a downlink optical detector for detecting the optical signal representative of the feedthrough null residual signal;

an variable attenuator-phase shifter, fed by a signal from the transmitter and the detected optical signal representative of the feedthrough null residual signal, for changing the gain and phase shift of the signal from the transmitter in accordance with the signal detected optical signal to produce a replica of the transmitted signal with proper gain and phase shift to null feedthrough signals received at the receiving antenna station;

a "local" uplink laser;

a "local" uplink modulator, fed by the uplink laser and the gain and phase changed signal produced by the variable attenuator-phase shifter, for producing an optical signal representative of the replica of the transmitted signal with proper gain and phase shift to null feedthrough signals received at the receiving antenna station such fed signal;

an uplink detector, disposed at the antenna station, for detecting the optical signal fed thereto from the uplink laser modulator, for producing the feedthrough nulling signal.

4. The system recited in claim 3 including a "local" noise degeneration system, comprising:

a "local" detector for detecting the optical signal produced by the uplink laser modulator to produce the noise cancellation signal;

a noise cancellation combiner fed by the noise cancellation signal and a signal from the transmitter;

and wherein the variable gain-phase shifter combines an output of the noise cancellation combiner and the detected optical signal representative of the feedthrough null residual signal, for changing the gain and phase shift of the signal from the transmitter in accordance with the signal detected optical signal and the output of the noise cancellation combiner, to produce the replica of the transmitted signal with proper gain and phase shift to null feedthrough signals received at the receiving antenna station.

\* \* \* \* \*